Nov. 9, 1965   J. VOJINOV   3,216,144
ALL-PURPOSE FISHING ROD
Filed Feb. 25 1964
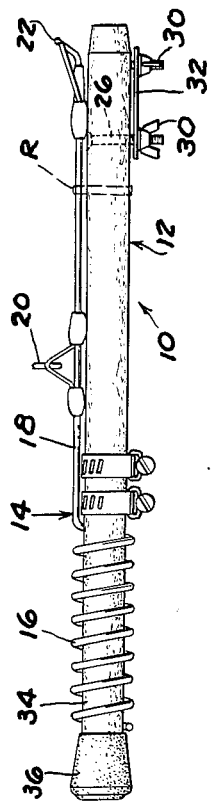
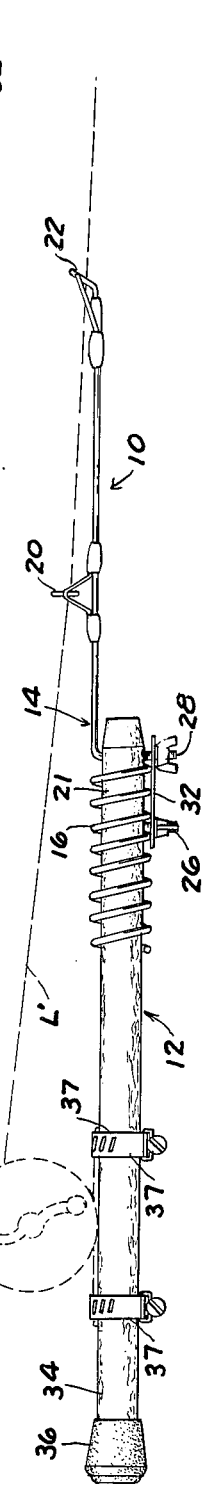
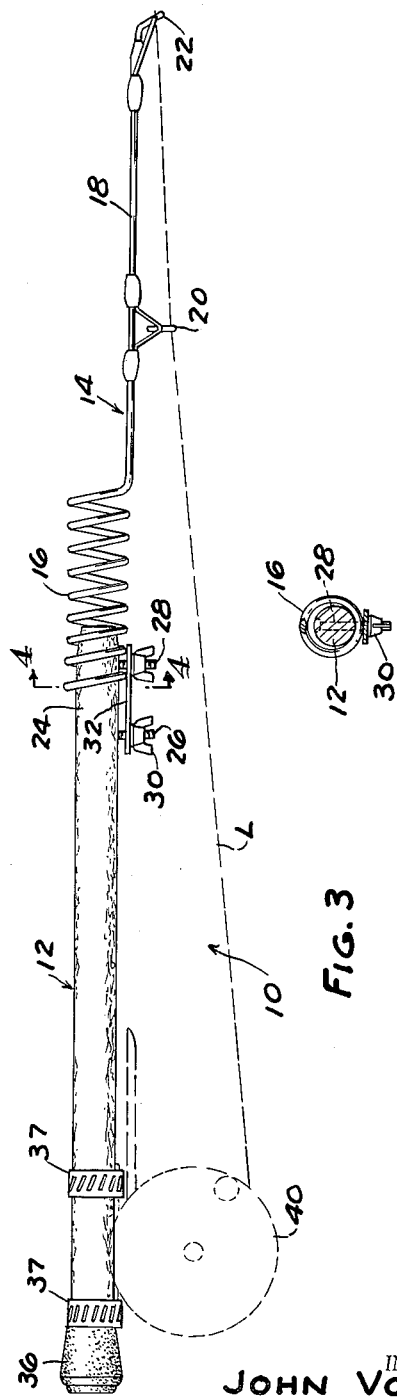
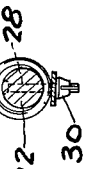
INVENTOR.
JOHN VOJINOV
BY
Barnes, Kisselle, Raisch & Choate
ATTORNEYS

United States Patent Office 3,216,144
Patented Nov. 9, 1965

3,216,144
ALL-PURPOSE FISHING ROD
John Vojinov, 18610 Ford Road, Detroit, Mich.
Filed Feb. 25, 1964, Ser. No. 347,657
9 Claims. (Cl. 43—18)

This invention relates to a fishing rod adapted to use in various kinds of fishing, for example, bait casting, fly casting, still fishing, and the like.

In bait casting, a relatively heavy lure is used in conjunction with a relatively stiff rod. In fly casting, a relatively light-weight lure is used in conjunction with a relatively flexible rod which whips during the casting motion to cast the line and the lure or fly. Conventional bait-casting rods are not suitable for fly casting, and vice versa. To be prepared for either type of fishing with conventional equipment, a fisherman must purchase and carry with him two separate rods. Both types of rods are relatively costly and usually somewhat delicate.

The object of this invention is to provide a simple, rugged, inexpensive fishing rod which has adjustable flexibility so that it can be used selectively for bait casting and fly casting, as well as other types of fishing, and which has portions which can be nested in a short length for storage while not in use.

Generally, the invention contemplates the combination of a handle and a rod proper, the latter having a coil spring provided adjacent one end. Means are provided by which different lengths of the coil spring can be threaded into supported engagement with the handle, leaving a selected length of the spring unsupported, whereby to adjust the flexibility of the rod for use in bait casting or fly casting. The spring can be detached from the forward end of the handle and disposed about the butt end of the handle with the line-supporting portion of the rod nested alongside the length of the handle for storage purposes.

One form of the invention is shown in the accompanying drawings.

FIG. 1 is a side elevation of a rod according to this invention with the components nested for storage while not in use.

FIG. 2 is an elevational view of the rod with the components arranged for use in bait casting.

FIG. 3 is an elevational view of the rod with the components arranged for use in fly casting.

FIG. 4 is a sectional view on line 4—4 of FIG. 3.

Shown in the drawings is a rod 10 according to this invention having a handle 12 and a rod member 14. Handle 12 is relatively rigid and can be made of any suitable inexpensive stock such as wood, plastic rod, or plastic or metal tubing. Rod member 14 is also made of a relatively inexpensive material such as metal wire.

Rod member 14 has a coil spring configuration 16 adjacent one end and extending therefrom is the line-supporting portion 18 which is provided with a suitable line guide 20 and tip guide 22. The coil spring portion of the rod member is relatively flexible in a lateral direction while straight portion 18 thereof is relatively stiff. Straight portion 18 extends longitudinally away from the peripheral portion of coil 16 for a purpose to be described.

Coil spring 16 is dimensioned so that the various portions of handle 12 can be fitted into it. Means are provided by which the longitudinal position of coils 16 relative to the forward end portion 24 of handle 12 can be adjusted. By way of example, the forward end portion of the handle is provided with two longitudinally spaced studs 26, 28 whose ends project laterally through and outwardly of convolutions of coil spring 16, thereby providing threading elements for the convolutions.

Means are provided for securing the coil spring in a selected longitudinal position, and for this purpose, the studs are threaded for receiving clamping wing nuts 30. A clamping bar 32 is shown as being interposed between nuts 30 and the exterior of the spring convolutions. This bar has holes through which studs 26 and 28 pass. Washers or the like (not shown) could be substituted for bar 32.

Means are provided for securing the rearward end portion 34 of handle 12 against withdrawal from within coil spring in stored relation of the rod illustrated in FIG. 1. Conveniently, this means comprises a rubber butt cap 36 frictionally engaged with the rear end of the handle. Two "Hy-Gear" flexible metal bands are provided for clamping a reel 38 or 40 to selected longitudinal positions on handle 12.

As to use of the rod, it may be assumed that initially it is in the condition illustrated in FIG. 1 with coil spring 16 disposed around the rearward portion 34 of handle 12. Since straight portion 18 of the rod extends from the outer periphery of the coil spring, it nests along side handle 12 as shown. Butt cap 36 prevents coil spring 16 from slipping longitudinally off of the rearward end of the handle. Straight portion 18 of the rod member can be secured in place by any suitable means such as a rubber band R. Wing nuts 30 are drawn up relatively snugly so that they will not work off their respective studs.

To prepare the rod for use, butt cap 36 is removed from handle 12 as is rubber band R and coil spring 16 is slipped rearwardly off of the handle. After wing nuts 30 are loosened, forward end portion 24 of the handle is inserted into the coil spring which is then rotated to thread the convolutions thereof past stud 28. If the rod is to be used for fly casting, only one or two convolutions of the coil spring are threaded past stud 28 and the wing nut 30 thereon is threaded inwardly so that it and bar 32 clamp the convolutions firmly against handle 12.

The parts are now in the condition shown in FIG. 3 wherein a large portion of coil spring 16 extends out of supported relation with handle 12. The unsupported portion of the coil is relatively flexible, and the rod is in condition for use in fly casting. A suitable fly casting reel 40 is clamped to the rearward, under portion of handle 12 by bands 37 and line L is threaded through guides 20, 22.

If the rod is to be used for bait casting, forward end 24 of the handle is inserted into the coil spring as before, but rod member 14 is rotated until all or a major portion of the convolutions of coil spring 16 have been threaded past stud 28. Some of the convolutions will also thread past stud 26 as shown in FIG. 2. Wing nuts 30 are tightened to anchor the coil spring firmly in place on handle 12. The parts are now in the condition illustrated in FIG. 2.

All of the coil spring is rigidly supported by handle 12 and only the relatively rigid straight portion 18 of the rod projects from the handle. Thus, the rod is conditioned for use in bait casting. A bait casting reel 38 is anchored in position on an upper, intermediate portion of the handle by means of bands 37, leaving enough room behind the reel for a hand grip, and line L' is threaded through tips 20, 22 as shown.

From the drawing, it will be seen that straight rod portion 18 and guides 20, 22 thereon can be positioned above or below handle 12 in angular alignment with reel 38 or 40, whichever is used.

To those versed in the art, it will be apparent that rod 10 can be used in still fishing and other kinds of fishing as well as in casting.

When it is desired to store the rod, wing nuts 30 are loosened and rod member 14 rotated to thread coil spring 16 out of engagement with studs 26, 28. The rod member is thereby detached from the rod. Butt cap 36 is removed, and rear end portion 34 of the handle is inserted through coil spring 16. The butt cap is replaced and rubber band R or the like is also replaced. Rod member 14 is preferably no longer than handle 12 so that it will nest throughout its length beside the handle.

The rod structure 10 is made of a very few elements, each of which in itself is inexpensive. Each element is relatively rugged so that the rod can be stored loose, for example, in the trunk of an automobile with little danger of significant damage thereto. The rods can be quickly assembled in bait casting or fly casting positions and quickly returned to the stored position of FIG. 1.

I claim:
1. Fishing rod structure comprising,
a handle,
a rod having one portion of coil spring configuration which is relatively flexible in a lateral direction and another relatively stiff portion extending longitudinally from said one portion to provide support for a fish line,
said handle having a portion adjacent an end thereof dimensioned to fit said one rod portion so that said handle portion and one rod portion are in longitudinally overlapping relation,
said handle portion having means slidably engageable by convolutions of said coil spring configuration and thereby providing a threaded connection between said handle portion and said one portion of said rod,
said one rod portion having a length such that when convolutions adjacent an end thereof are engaged with said means, other convolutions extend longitudinally out of supported engagement with said handle portion,
said one rod portion, responsive to rotation thereof relative to said means, being movable longitudinally of said handle portion to adjust the unsupported length of said one rod portion, and thereby adjust the rod selectively to different conditions of lateral stability for use in different types of fishing,
and releasable locking means operable to lock said one rod portion in adjusted position.
2. The structure defined in claim 1 wherein said one rod portion is disposed around the exterior of said handle portion.
3. The structure defined in claim 2 wherein the first said means comprises studding on said handle portion which projects laterally between convolutions of said coil spring.
4. The structure defined in claim 3 wherein said studding projects laterally through and outwardly of said convolutions, said locking means including means outwardly of said convolutions releasably cooperable with said studding to clamp said convolutions against said handle portion.
5. The structure defined in claim 4 wherein said studding is threaded and said cooperable means includes a nut thereon.
6. The structure defined in claim 4 wherein said studding comprises at least two studs spaced longitudinally of said handle portiton, said locking means including a clamping bar having holes through which said studs project and releasable means cooperable with said studs to urge said bar into clamped relation with the exterior of said convolutions.
7. The structure defined in claim 1 wherein said one rod portion is detachable from said handle portion responsive to rotation thereof relative to the first said means, said handle having another portion adjacent its other end dimensioned to be inserted within said rod portion, said other rod portion extending longitudinally from the periphery of said coil spring configuration so that it lies alongside said handle in stored position when said other handle portion is inserted in said one rod portion.
8. The structure defined in claim 7 wherein said rod has a length no greater than said handle.
9. The structure defined in claim 7 and including in addition means operable selectively to secure said other handle portion against withdrawal from said one rod portion and to free said other handle portion for withdrawal therefrom.

References Cited by the Examiner
UNITED STATES PATENTS

| | | |
|---|---|---|
| 1,000,645 | 8/11 | Nieuwkerk et al. |
| 2,538,338 | 1/51 | Sturdevant _____ 43—18 |

ABRAHAM G. STONE, *Primary Examiner.*